(No Model.)
H. W. LIBBEY.
WHEEL FOR VEHICLES.
No. 413,858. Patented Oct. 29, 1889.
FIG. 1.  FIG. 2.
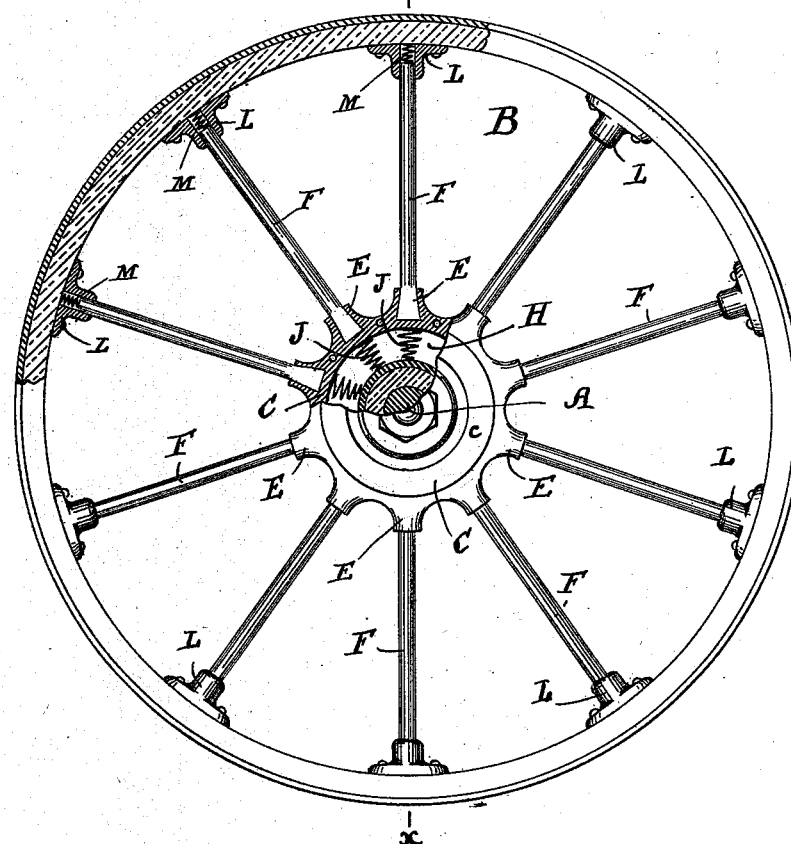
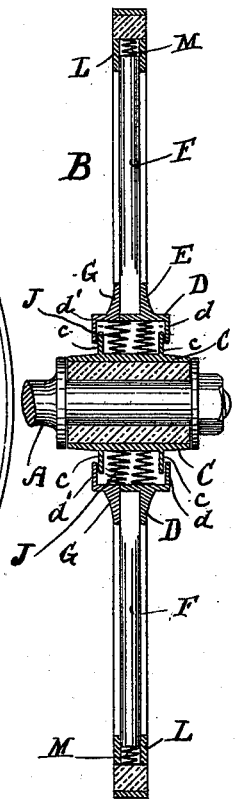
FIG. 3.  FIG. 4.  FIG. 5.
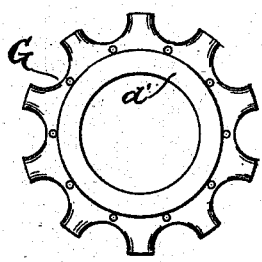
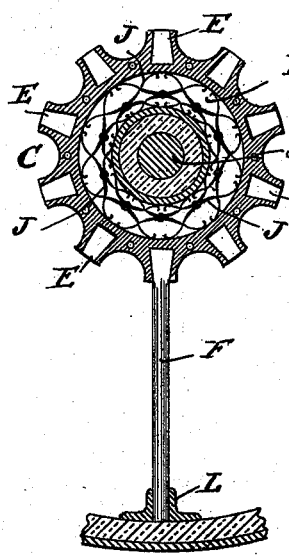
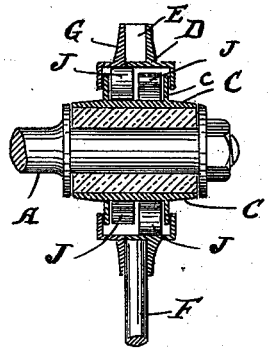
FIG. 6.
Witnesses
J. George Seltzer
R. J. White
Inventor
Hosea W. Libbey
Per E. Planta.
Attorney.

UNITED STATES PATENT OFFICE.

HOSEA W. LIBBEY, OF BOSTON, MASSACHUSETTS.

WHEEL FOR VEHICLES.

SPECIFICATION forming part of Letters Patent No. 413,858, dated October 29, 1889.

Application filed January 20, 1887. Serial No. 224,943. (No model.)

*To all whom it may concern:*

Be it known that I, HOSEA W. LIBBEY, a citizen of the United States, residing at Boston, in the county of Suffolk and State of Massachusetts, have invented a new and useful Improvement in Wheels for Vehicles, of which the following is a specification.

The object of my invention is to produce a wheel for carriages and other vehicles, whereby I am enabled to dispense with the springs now ordinarily used, and at the same time the jar in passing over rough or uneven roads will be lessened or prevented and the carriage caused to run lighter and more steadily.

The invention consists in providing the hub of the wheel with strong metallic springs, as hereinafter fully described.

Referring to the accompanying drawings, Figure 1 represents a wheel, partly in section, embodying my invention. Fig. 2 is a vertical section taken on line $x\ x$ of Fig. 1. Fig. 3 is a view of the cap or cover for securing the spokes in position. Fig. 4 is a view of the hub and a portion of a wheel with another arrangement of springs. Fig. 5 is a section through the same. Fig. 6 represents one of the springs detached.

A represents the axle of a carriage or other vehicle, upon which is mounted the wheel B. The hub of the wheel is made in two parts, one part C secured so as to run freely on the axle A, and provided with two flanges $c\ c$, projecting outward. The other part D is of slightly larger diameter than the flanges $c$ of the part C, and is provided with a flange $d$, that overlaps one of the flanges $c$, as shown. The perimeter of the part D is provided with a series of box-like projections E, to receive the ends of the spokes F. These projecting pieces are formed tapering, (see Figs. 1 and 4,) so that the ends of the spokes, which are formed to correspond, when inserted therein, cannot be drawn out, and are securely held by means of a cap or cover G, bolted or otherwise secured to the part D. This cap or cover is also provided with a flange $d'$, that overlaps the other flange $c$, so that by means of the flanges $c\ c\ d\ d'$ dust, dirt, &c., are excluded from the space H, formed between the parts C and D. In the space H between the parts C and D of the hub I secure strong coil or other metallic springs J. These springs I prefer to arrange in two series around the hub, as shown; but of course one or more than two series may be employed, if desired. It will be seen that I am thus enabled to dispense with the springs ordinarily employed on carriages, as by the arrangement of the springs described the required amount of play will be allowed to the part C of the hub as the wheel revolves, so that when the wheel is running on uneven ground the jar will be taken off the axle A by means of the said springs, and if running on even ground the springs will be slightly compressed as the wheel revolves, and consequently cause the carriage to run very smoothly.

In Figs. 1 and 2 I have shown conical coil-springs, and in Figs. 4 and 5 I have shown a spring of double-V form, which may consist of any desired number of leaves; but any other suitable spring may be employed.

The outer ends of the spokes I prefer to secure to the felly by means of shoes L, a strong spring M being inserted between the end of the spoke and the felly, as shown in Figs. 1 and 2; or, if desired, these springs may be dispensed with and the end of the spoke rest against the felly.

What I claim as my invention is—

The herein-described vehicle-wheel, consisting of the hub comprising the two bands having flanges fitting together to provide a chamber, the two sets of springs arranged in said chamber, the spokes having their inner ends rigidly connected to the outer of said bands and their outer ends bearing against springs or cushions carried by the felly of the wheel, substantially as shown, and for the purpose described.

In testimony whereof I have signed my name to this specification in the presence of two subscribing witnesses.

HOSEA W. LIBBEY.

Witnesses:
L. W. HOWES,
E. PLANTA.